United States Patent
Shindo et al.

(10) Patent No.: US 8,007,652 B2
(45) Date of Patent: Aug. 30, 2011

(54) METHOD FOR COLLECTION OF VALUABLE METAL FROM ITO SCRAP

(75) Inventors: Yuichiro Shindo, Ibaraki (JP); Kouichi Takemoto, Ibaraki (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 384 days.

(21) Appl. No.: 12/445,776

(22) PCT Filed: Jun. 27, 2007

(86) PCT No.: PCT/JP2007/062899
§ 371 (c)(1),
(2), (4) Date: Apr. 16, 2009

(87) PCT Pub. No.: WO2008/053620
PCT Pub. Date: May 8, 2008

(65) Prior Publication Data
US 2010/0193372 A1    Aug. 5, 2010

(30) Foreign Application Priority Data

Oct. 24, 2006   (JP) ................................ 2006-288189

(51) Int. Cl.
*C25C 1/00* (2006.01)
*C25C 1/14* (2006.01)
*C25C 1/22* (2006.01)
*C25C 5/02* (2006.01)
*C01G 19/00* (2006.01)
*C01G 15/00* (2006.01)
*C22B 25/00* (2006.01)
*C22B 58/00* (2006.01)
*C25B 11/04* (2006.01)

(52) U.S. Cl. ........... 205/557; 423/89; 423/111; 423/115
(58) Field of Classification Search .................. None
See application file for complete search history.

(56) References Cited

U.S. PATENT DOCUMENTS

| | | | |
|---|---|---|---|
| 5,290,412 | A  | 3/1994  | Saito et al. |
| 6,896,788 | B2 | 5/2005  | Shindo et al. |
| 7,435,325 | B2 | 10/2008 | Shindo et al. |
| 2009/0004498 | A1 | 1/2009 | Shindo et al. |
| 2010/0072075 | A1 | 3/2010 | Shindo et al. |
| 2010/0084279 | A1 | 4/2010 | Shindo et al. |
| 2010/0084281 | A1 | 4/2010 | Shindo et al. |
| 2010/0101963 | A1 | 4/2010 | Shindo et al. |
| 2010/0101964 | A1 | 4/2010 | Shindo et al. |

FOREIGN PATENT DOCUMENTS

| | | | |
|---|---|---|---|
| JP | 08041560 A   | * | 2/1996 |
| JP | 2003-247089 A |   | 9/2003 |
| JP | 2005-314786 A |   | 11/2005 |

OTHER PUBLICATIONS

English Translation of JP 08-041560 from PAJ Website.*
One page English language Abstract of JP 62-290900 A, Dec. 17, 1987.
One page English language Abstract of JP 08-041560 A, Feb. 13, 1996.
One page English language Abstract of JP 03-082720 A, Apr. 8, 1991.
One page English language Abstract of JP 2000-169991 A, Jun. 20, 2000.
One page English language Abstract of JP 2002-069684 A, Mar. 8, 2002.
One page English language Abstract of JP 2002-069544 A, Mar. 8, 2002.
One page English language Abstract of JP 2002-241865 A, Aug. 28, 2002.

* cited by examiner

*Primary Examiner* — Melvin Mayes
*Assistant Examiner* — Colin W Slifka
(74) *Attorney, Agent, or Firm* — Howson & Howson LLP

(57) ABSTRACT

Proposed is a method for collecting valuable metal from an ITO scrap including the steps of subjecting the ITO scrap to electrolysis and collecting the result as indium-tin alloy. Additionally provided is a method for collecting valuable metal from an ITO scrap including the steps of providing an ITO electrolytic bath and an indium-tin alloy collecting bath, dissolving the ITO in the electrolytic bath, and thereafter collecting indium-tin alloy in the indium-tin alloy collecting bath. These methods enable the efficient collection of indium-tin alloy from an ITO scrap of an indium-tin oxide (ITO) sputtering target or an ITO scrap such as ITO mill ends arisen during the manufacture of such ITO sputtering target.

3 Claims, No Drawings

METHOD FOR COLLECTION OF VALUABLE METAL FROM ITO SCRAP

BACKGROUND OF THE INVENTION

Technical Field

The present invention relates to a method for collecting valuable metal from an ITO scrap such as a spent indium-tin oxide (ITO) sputtering target or ITO mill ends arisen during the manufacture of the ITO sputtering target (hereinafter collectively referred to as an "ITO scrap" in this specification).

In recent years, an indium-tin oxide ($In_2O_3$—$SnO_2$: generally known as ITO) sputtering target is being widely used for a transparent conductive thin film of an LCD device or a gas sensor. In many cases, however, a thin film is formed on a substrate or the like by employing the sputtering method as the thin-film forming means.

Although the sputtering method as the thin-film forming means is a superior method, if a sputtering target is used to form a transparent conductive thin film, the target will not be consumed uniformly. A portion of the target with severe consumption is generally referred to as an eroded portion, and the sputtering operation is continued until immediately before a backing plate supporting the target becomes exposed due to the further consumption of the eroded portion. This target is subsequently replaced with a new target.

Accordingly, a spent sputtering target will have numerous non-eroded portions; that is, unused portions of the target, and all of these portions become scrap. Moreover, even during the manufacture of ITO sputtering targets, scraps (mill ends) will arise from mill ends, grinding dust and cutting wastage. Generally speaking, the scrap contains roughly 9.7 wt % of tin oxide ($SnO_2$), but the scrap is mostly indium oxide ($In_2O_3$).

Because high-purity materials are used as the ITO sputtering target material and because indium is particularly expensive, indium and tin are simultaneously collected from the foregoing scrap materials. As this kind of indium collection method, conventionally, a method that combines wet refining such as the acid solution process, ion exchange method, and solvent extraction method is used.

For instance, there is a method of subjecting an ITO scrap to cleansing and pulverization, dissolving the ITO scrap in nitric acid, precipitating and eliminating impurities, such as zinc, tin, lead and copper, as sulfide by passing hydrogen sulfide through the solution, thereafter adding ammonia to neutralize the solution, and collecting the resulting indium hydroxide.

Nevertheless, the indium hydroxide obtained by the foregoing method has inferior filtration property, requires long operational process, and contains large amounts of impurities such as Si and Al. In addition, with the created indium hydroxide, since the grain size and grain size distribution will vary depending on the neutralization condition, maturization condition and other conditions, there is a problem in that the characteristics of the ITO target cannot be stably maintained upon subsequently manufacturing such ITO target.

Conventional technology and its advantages and disadvantages are described below.

As one example of such conventional technology, there is an etching method of a transparent conductive film including the steps of reducing an ITO film deposited on a substrate by an electrochemical reaction in the electrolyte, and dissolving the reduced transparent conductive film in the electrolyte (refer to Patent Document 1). However, the object of this method is to obtain a mask pattern with high precision, and relates to technology that is different from the collection method.

For pretreatment to collect valuable metal from ITO, there is also technology of separating, in the electrolyte, the impurities contained in an In-based brazing filler material used in the bonding with the backing plate (refer to Patent Document 2). Nevertheless, this method does not relate to technology of directly collecting valuable metal from ITO.

Moreover, upon collecting indium from an intermediate obtained as a by-product of the zinc refining process or an ITO scrap, disclosed is technology of separating tin as halogenated stannate, performing reduction treatment with hydrochloric acid or nitric acid solution, subsequently adjusting the pH of this aqueous solution to 2 to 5, reducing metallic ions of iron, zinc, copper, thallium and the like in order to make the metallic ions into a substance that will not precipitate easily, and separating the indium component in the aqueous solution (refer to Patent Document 3). With this technology, however, there is a problem in that the refining process is complicated, and a superior refining effect cannot be expected.

Further, as a method for collecting high-purity indium, disclosed is technology of dissolving ITO in hydrochloric acid, adding alkali thereto to make the pH 0.5 to 4, eliminating tin as hydroxide, subsequently blowing hydrogen sulfide gas in order to eliminate hazardous materials such as copper and lead as sulfide, and electrowinning indium metal by performing electrolysis using the obtained solution (refer to Patent Document 4). There is a problem with this technology in that the refining process is complicated.

In addition, proposed is a method of dissolving an ITO indium-containing scrap in hydrochloric acid to obtain an indium chloride solution, adding a sodium hydroxide solution to this solution to eliminate tin as tin hydroxide, additionally adding a sodium hydroxide solution after the elimination to obtain indium hydroxide, filtering the obtained indium hydroxide to obtain indium sulfate from the filtered indium hydroxide, and obtaining indium by electrowinning the indium sulfate (refer to Patent Document 5). Although this is an effective method with a significant refining effect, there is a drawback in that the process is complicated.

Also proposed is a method for collecting indium including the steps of dissolving an ITO indium-containing scrap in hydrochloric acid to obtain an indium chloride solution, adding a sodium hydroxide solution to the indium chloride solution to eliminate tin contained in the scrap as tin hydroxide, substituting indium with zinc from the solution after eliminating the tin hydroxide, and thereafter collecting indium (refer to Patent Document 6). Although this is also an effective method with a significant refining effect, there is a drawback in that the process is complicated.

Additionally disclosed is a method for collecting metallic indium including the steps of extracting suboxide-containing cast scrap floating on molten metallic indium, introducing this into an atmosphere furnace, introducing argon gas into the furnace after vacuating the furnace once, heating the furnace to a prescribed temperature, and reducing the suboxide-containing cast scrap (refer to Patent Document 7).

Although this is in itself an effective method, there is a drawback in that this is not a fundamental collection method of ITO scrap.

In light of the above, a method that is efficient and with a versatile collection process is being sought.

[Patent Document 1] Japanese Patent Laid-Open Publication No. S62-290900

[Patent Document 2] Japanese Patent Laid-Open Publication No. H8-41560
[Patent Document 3] Japanese Patent Laid-Open Publication No. H3-82720
[Patent Document 4] Japanese Patent Laid-Open Publication No. 2000-169991
[Patent Document 5] Japanese Patent Laid-Open Publication No. 2002-69684
[Patent Document 6] Japanese Patent Laid-Open Publication No. 2002-69544
[Patent Document 7] Japanese Patent Laid-Open Publication No. 2002-241865

DISCLOSURE SUMMARY OF THE INVENTION

In order to overcome the foregoing problems, the present invention provides a method for efficiently collecting indium-tin alloy from an ITO scrap of an indium-tin oxide (ITO) sputtering target or an ITO scrap such as ITO mill ends arising during the manufacture of such ITO sputtering target.

Specifically, the present invention provides a method for collecting valuable metal from an ITO scrap including the steps of subjecting the ITO scrap to electrolysis and collecting the result as indium-tin alloy. As the electrolyte upon collecting valuable metal from the ITO scrap, sulfuric acid and hydrochloric acid are primarily used. In addition, an electrolytic solution to which an electrolyte such as ammonium sulfate, sodium chloride, sodium sulfate or the like is added as needed may also be used. Electrolyte of an alkali solution may also be used. There is no particular limitation on the foregoing electrolyte solution, and conditions for efficiently collecting valuable metal may be arbitrarily selected.

The conditions for performing electrolysis to the scrap such as mill ends are not uniformly defined, and the current density is appropriately selected according to the amount of such mill ends or the property of the material. The liquid temperature of the electrolyte solution is generally in the range of 0 to 100° C., and preferably in the range of 20 to 50° C.

The method for collecting indium-tin alloy by electrolysis according to the present invention is an extremely simple method since the ITO scrap is simply subject to electrolysis as an anode. Nevertheless, no conventional technology has previously adopted this kind of method.

The present invention is also able to subject the ITO scrap to electrolysis in an electrolytic bath partitioned with a diaphragm or an ion-exchange membrane. Moreover, it is also possible to provide an ITO electrolytic bath and an indium-tin alloy collecting bath, dissolve the ITO in the electrolytic bath, and thereafter collect the indium-tin alloy in the indium-tin alloy collecting bath.

Once indium-tin alloy is collected from the ITO, it can be used as is, and it is also easy to add metallic indium or metallic tin to the indium-tin alloy to change the alloy component content, or add other elements. In addition, it is also easy to manufacture a recycled ITO with the obtained indium-tin alloy as the raw material. The present invention covers all of the foregoing aspects.

The provided method for efficiently collecting high-purity indium-tin alloy is a superior method since indium-tin alloy can be collected extremely easily; that is, an ITO scrap of an indium-tin oxide (ITO) sputtering target or an ITO scrap such as ITO mill ends arising during the manufacture of such ITO sputtering target is simply subject to electrolysis as an anode.

BEST MODE FOR CARRYING OUT DETAILED DESCRIPTION OF THE INVENTION

The present invention provides a method for collecting indium-tin alloy simply from an indium-containing scrap of an ITO target by electrolysis. Since the ITO scrap as the raw material has generally achieved a high purity, it goes without saying that the valuable metal collected therefrom also possesses the quality as a high-purity material. Basically, the purity of the raw material reflects on the foregoing purity.

As the electrolyte, an acid solution of sulfuric acid or hydrochloric acid can be used, and electrolyte added with ammonium sulfate, sodium chloride, sodium sulfate or the like may also be used. In order to improve the current efficiency, well-known additive agents may also be used. The use of an additive agent is subject to the condition that such additive agent will not deteriorate the purity of the product.

Since the object of the present invention can be attained if it is possible to perform electrolysis, alkali electrolyte may also be used. The present invention covers all of the foregoing aspects.

A special electrolytic apparatus is not required. For instance, the ITO to be subject to electrolysis is used as the anode, and a corrosion-resisting electrode such as carbon is used as the cathode mother plate when performing electrolysis. It is thereby possible to avoid the increase or inclusion of impurities in the anode.

It is desirable to adjust the current density as needed based on the type of raw material. The factor to be adjusted in this case is only the production efficiency. Although there is no particular limitation on the electrolysis temperature, desirably electrolysis is performed by adjusting the temperature to be in a range of 0 to 100° C. Since the current efficiency will deteriorate if the electrolysis temperature is less than 0° C. and the evaporation of the electrolyte will increase if the electrolysis temperature exceeds 100° C., a more preferable range of the electrolysis temperature is 20 to 50° C.

EXAMPLES

The present invention is now explained in detail with reference to the Examples. These Examples are merely illustrative, and the present invention shall in no way be limited thereby. In other words, various modifications and other embodiments based on the technical spirit claimed in the claims shall be included in the present invention as a matter of course.

Example 1

2 kg of ITO (indium oxide-tin oxide) mill ends were used as the raw material. The components in this raw material were 9.7 wt % of tin oxide ($SnO_2$) and the remainder indium oxide ($In_2O_3$).

The raw material was used as an anode, and electrolytic refining was performed in a sulfuric acid bath of 0.1 to 2N at a liquid temperature of 50° C. Consequently, In—Sn alloy electrodeposited on the cathode side. It was thereby possible to collect approximately 1.4 kg of In—Sn alloy from ITO (indium oxide-tin oxide) mill ends.

Example 2

2 kg of ITO (indium oxide-tin oxide) spent scrap was used as the raw material. The components in this raw material were the same as Example 1. The raw material was used as an anode, and electrolytic refining was performed in a hydrochloric acid bath of 2N at a liquid temperature of 25° C. Consequently, In—Sn alloy electrodeposited on the cathode side.

It was thereby possible to collect approximately 1.45 kg of In—Sn alloy from ITO (indium oxide-tin oxide) mill ends.

Example 3

50 g/L of sodium hydroxide solution was placed in an electrolytic bath, 2 kg of ITO (indium oxide-tin oxide) scrap was additionally placed on the anode side of the electrolytic bath, and electrolysis was performed at a liquid temperature of 25° C. The scrap raw material in this case was the same as Example 1. Consequently, In—Sn alloy electrodeposited on the cathode side. It was thereby possible to collect approximately 1.5 kg of In—Sn alloy from the ITO (indium oxide-tin oxide) scrap.

Example 4

50 g/L of sodium hydroxide solution was placed in an electrolytic bath, 2 kg of ITO (indium oxide-tin oxide) scrap was additionally placed on the anode side of the electrolytic bath, and electrolysis was performed at a liquid temperature of 25° C. The scrap raw material in this case was the same as Example 1. Upon performing the electrolysis, the anode and the cathode were partitioned with a diaphragm. Sludge was eliminated with the diaphragm. Consequently, In—Sn alloy electrodeposited on the cathode side, and it was thereby possible to collect approximately 1.5 kg of In—Sn alloy from the ITO (indium oxide-tin oxide) scrap.

Example 5

The same raw material as Example 1 was used, and the same electrolytic conditions were adopted. Further, an ITO scrap was placed in an anode box of the electrolytic bath, the electrolytic bath was partitioned with an anion-exchange membrane, and sulfuric acid of 0.1 to 2N was used on the cathode side. Subsequently, this solution was extracted, sludge and fine particles were eliminated with a filter, and the resulting solution was placed in a collecting bath and subject to electrowinning to collect approximately 1.3 kg of In—Sn alloy.

Although in each of the foregoing Examples, ITO (indium oxide-tin oxide) mill ends or ITO scraps containing 9.7 wt % of tin oxide ($SnO_2$) and remainder indium oxide ($In_2O_3$) were used, it is possible to arbitrarily change the electrolytic conditions such as the current density and pH according to the component amount of $In_2O_3$ and $SnO_2$, and it goes without saying that there is no particular limitation on the component amount of the raw material. In particular, although the content of tin oxide ($SnO_2$) in the ITO is changed between 5 wt % to 30 wt %, the present invention can still be applied to this case.

In addition, although there are cases where small amounts of accessory components are added to the ITO, so as long as ITO is the basic constituent, it goes without saying that the present invention can also be applied to this case.

INDUSTRIAL APPLICABILITY

The present invention yields a significant industrial advantage in terms of recycling of the expensive indium since provided is a superior method in which high-purity indium-tin alloy can be collected extremely easily and efficiently; that is, an ITO scrap of an indium-tin oxide (ITO) sputtering target or an ITO scrap such as ITO mill ends arising during the manufacture of such ITO sputtering target is simply subject to electrolysis as an anode.

The invention claimed is:

1. A method for collecting valuable metal from an ITO scrap including the steps of subjecting the ITO scrap to electrolysis as an anode so as to electrodeposit indium-tin alloy on a cathode and collecting the indium-tin alloy.

2. The method for collecting valuable metal from an ITO scrap according to claim 1, wherein the ITO scrap is subject to electrolysis as an anode in an electrolytic bath partitioned with a diaphragm or an ion-exchange membrane.

3. A method for collecting valuable metal from an ITO scrap including the steps of providing an ITO electrolytic bath and an indium-tin alloy collecting bath, subjecting the ITO scrap to electrolysis as an anode in the electrolytic bath, placing a solution obtained by the electrolysis in the indium-tin alloy collecting bath, and collecting indium-tin alloy in the indium-tin alloy collecting bath by electrowinning.

* * * * *